Nov. 24, 1959  F. S. ALLINQUANT  2,914,089
DIAPHRAGM DEVICE FOR SEPARATING TWO DIFFERENT
FLUIDS IN A CYLINDRICAL CHAMBER
Filed June 10, 1957

United States Patent Office 2,914,089
Patented Nov. 24, 1959

2,914,089

DIAPHRAGM DEVICE FOR SEPARATING TWO DIFFERENT FLUIDS IN A CYLINDRICAL CHAMBER

Fernand Stanislas Allinquant, Paris, France

Application June 10, 1957, Serial No. 664,666

Claims priority, application France June 11, 1956

1 Claim. (Cl. 137—784)

It is often useful to use a membrane to separate fluids of different natures present at the same time, especially a gas and a liquid in pressure equilibrium, the solution or the emulsion of which is to be avoided.

In particular, in oleo-pneumatic telescopic suspension apparatus, such as that which formed the subject of French Patent No. 963,662 of March 9, 1948, in which the elastic force of a compressed gas is associated with the hydraulic shock-absorbing effect produced by the passage of a liquid through orifices, it is necessary to separate the liquid from the gas by a membrane or diaphragm which ensures the transmission of pressures in the most direct and the most simple possible manner, together with a possibility of a large movement in a small space.

The present invention relates to a membrane device which has been more particularly designed with a view to this application.

The invention will be illustrated by the description which follows of one preferred form of construction of this device, reference being made to the accompanying drawings, in which.

Figures 1, 2:
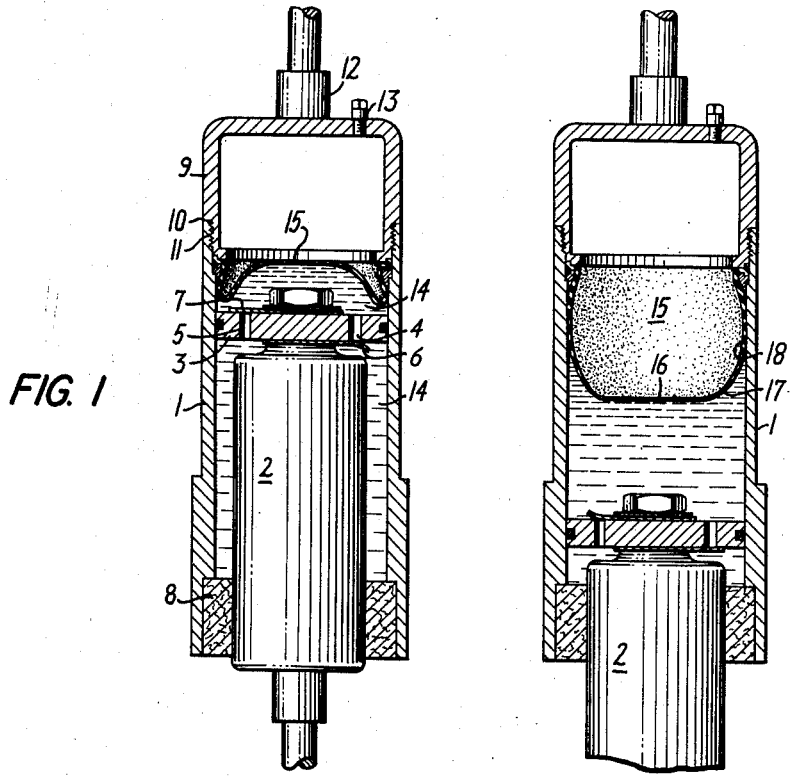
Fig. 1 and Fig. 2 are diagrammatic views in axial cross-section of an oleo-pneumatic telescopic suspension apparatus comprising the present device.

The apparatus comprises essentially a cylinder 1 and a plunger tube 2 provided with a piston 3 adapted to slide in the cylinder and having any known arrangement of oil passages and valves, for example that shown, which comprises the drilled holes 4 and 5, covered respectively by the non-return valves 6 and 7, having opposite directions of opening.

The plunger tube 2 which forms the piston rod, passes at the base of the cylinder 1 through a guiding and fluid-tight sealing device 8 of any known type. The cylinder 1 is extended and closed at its upper portion by a hood 9, the skirt of which has an external screwed portion starting from a shoulder 10 and screwed into the internally screwed portion 11 at the upper end of the cylinder. The base of the hood 9 carries the attachment rod 12 of the cylinder, and is provided with a valve 13 which enables air or compressed gas to be introduced into this hood, whilst the cylinder contains oil 14 on the two sides of the piston.

In accordance with the invention, the oil 14 of the cylinder is separated from the compressed air in the upper portion by a cup-shaped diaphragm indicated as a whole by 15, which is fixed to the lateral wall by its edges along the line of junction of the hood to the cylinder.

Figure 3:
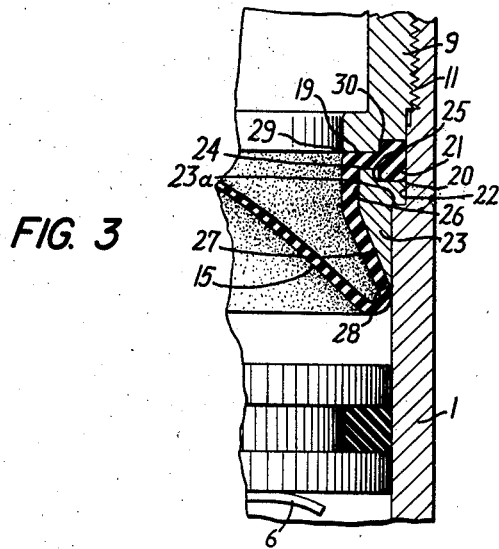
Fig. 3 is a partial view of a detail to a larger scale.

This diaphragm is made of an oil-resistant material which is as flexible as possible, for example a synthetic rubber with a base of neoprene. Its shape in the free condition is substantially that shown in Fig 2: it comprises a flat bottom portion 16 which becomes thicker towards the sides and is coupled by a rounded portion 17 of large radius to a cylindrical wall portion 18 which becomes progressively thicker towards the top. The cylindrical wall portion 18 is provided at its outlet with a flat external flange 19 (see Fig. 3) the edge of which is reinforced on its opposite faces by two annular additional thicknesses 20 and 21 with rounded edges forming a beaded edge.

The fixing of the diaphragm 15 is carried out in the following way. In a bore 22, having a diameter corresponding to the external diameter of the flange 19 and extending the threaded end portion 11 towards the interior of the cylinder, is fitted a ring 23 which has a shoulder 23a adapted to engage the bottom of the bore 22. The upper face 24 of this ring, having a radial width corresponding to the under-face of the flange 19 has a peripheral rebate of rectangular section 25 intended to house the annular flange 20. The inner surface of the ring 23 is formed at the top by a cylindrical bore 26, following which a conical bore 27 flares outwardly downwards and terminates in a rounded edge 28 of small radius. The extremity of the skirt of the hood 9, thickened internally and having an external diameter corresponding to the bore 22, terminates in a face 29 of radial width corresponding to the upper face of the flange 19, with a peripheral rebate 30 of rectangular section intended to house the annular flange 20. It is preferable that this rebate 30 should have a diameter slightly smaller than the rebate 25 of the ring. The edges are rounded-off on both these parts.

During assembly, the shouldered ring 23 being engaged until it abuts against the bottom of the bore 22, the cylinder is filled with a sufficient quantity of oil for the diaphragm 15 to be able to be brought into contact with the oil substantially in the same shape as it has in the free state, without any air being present under the diaphragm. The diaphragm is driven down until its flange 19 is supported on the ring, after which the hood 9 is screwed on until its shoulder 10 comes up against the end of the cylinder 1. In this position, the end faces 29 and 24 of the hood 9 and of the ring 23 are separated from each other by a distance less than the thickness of the internal zone of the flange 19, so that the latter becomes compressed inside that zone. The peripheral edge of the flange formed by the additional thicknesses 20 and 21 is then compressed substantially in the same manner. Finally, the suspension is pumped up through the valve 13 to the desired pressure.

When the plunger piston moves upwards during the course of compression of the apparatus, the volume of oil displaced by the inward movement of the piston rod produces a compression of the air in the upper chamber through the intermediary of the diaphragm 15, which finally takes up the position shown in Fig. 1, at the end of the compression travel. The conical form of the wall 27 of the ring, and the thinning of the diaphragm towards its bottom 16, facilitates the reverse turning movement of the diaphragm. On the other hand, at the end of the rebound movement, the diaphragm returns substantially to its free position (see Fig. 2), so that it only works with a slight stretching action which is an important condition for its long life.

With regard to the flange 19 which forms a non-working joint, it should be noted that during assembly, the compression of its internal zone has the effect of forcing a certain volume of rubber out into the housings 25 and 30, so that the peripheral flange fills the said housings and presses strongly against the outer wall, this ensuring fluid-tightness along the periphery, both in respect of the oil and the compressed air, and makes impossible any mixture of these two fluids.

The device has been described with reference to an oleo-pneumatic telescopic suspension apparatus. It is however quite clear that it may be applied to all cases in which it is necessary to ensure a separation between a liquid and a gas under pressure at varying levels in the interior of a cylindrical vessel.

What I claim is:

An elastic diaphragm device, comprising in combination a cylinder having a bore with an open top part of enlarged diameter forming a shoulder and having an internally threaded end portion, an externally stepped ring fitting within said bore against said shoulder and having an upper flat surface formed with a peripheral annular rebate and a bore progressively flaring from said surface towards said cylinder bore, a fluid-tight elastic diaphragm, cup-shaped in its unstressed position of rest, having a flat bottom portion, a lateral wall portion of substantially the same shape as the ring bore, and a flat external flange formed with a peripheral beaded edge and adapted to be supported by said ring, and a hood adapted to fit the enlarged top part of the cylinder bore and having an externally threaded portion to engage said internally threaded end portion to close said cylinder, and a flat under surface formed with a peripheral annular rebate and engaging the diaphragm flange, said flange having its flat portion clamped between the flat surfaces of the ring and of the hood, and its beaded edge compressed between the rebates of the same to be fluid-tightly pressed against the wall of the enlarged part of the cylinder bore.

References Cited in the file of this patent
UNITED STATES PATENTS

| | | |
|---|---|---|
| 2,317,073 | Martin | Apr. 20, 1943 |
| 2,371,632 | Lippincott | Mar. 20, 1945 |
| 2,460,168 | Caserta | Jan. 25, 1949 |
| 2,638,127 | Griswold | May 12, 1953 |
| 2,764,997 | McGuiston | Oct. 2, 1956 |
| 2,773,511 | Mercier | Dec. 11, 1956 |